United States Patent [19]
// Muramatsu et al.
// [11] Patent Number: 4,855,740
// [45] Date of Patent: Aug. 8, 1989

[54] KEYBOARD

[75] Inventors: Toshihiro Muramatsu; Kenzaburou Iijima; Yoshinori Hayashi, all of Hamamatsu, Japan

[73] Assignee: Yamaha Corporation, Japan

[21] Appl. No.: 101,141

[22] Filed: Sep. 25, 1987

[30] Foreign Application Priority Data

Oct. 1, 1986 [JP] Japan ................................ 61-233757

[51] Int. Cl.⁴ ................................................ G06F 3/02
[52] U.S. Cl. ....................................................... 341/23
[58] Field of Search ........ 340/365 R, 365 P, 365 VL; 400/484, 485, 490, 493; 235/145 R; 200/D47, 312–314; 341/22, 23, 31

[56] References Cited

U.S. PATENT DOCUMENTS 4,459,581 7/1984 Wilson et al. ................ 340/365 VL
4,531,119 7/1985 Nakayama et al. ................. 400/484
4,544,276 10/1985 Horodeck ........................... 400/484
4,551,717 11/1985 Dreher ......................... 340/365 VL
4,602,878 7/1986 Merner et al. ...................... 400/490

FOREIGN PATENT DOCUMENTS 3338047 5/1985 Fed. Rep. of Germany ...... 340/365 VL
3409980 9/1985 Fed. Rep. of Germany ...... 340/365 VL
0077539 5/1984 Japan ........................... 340/365 VL
0146316 8/1985 Japan ........................... 340/365 VL

OTHER PUBLICATIONS

Boehm, "Changeable Character Display Keyboard", Sep. 1979, IBM Technical Disclosure Bulletin, pp. 1368–1371.

*Primary Examiner*—Gerald Brigance
*Assistant Examiner*—Richard Hjerpe
*Attorney, Agent, or Firm*—Lerner, David, Littenberg, Krumholz & Mentlik

[57] ABSTRACT

In construction of a keyboard for word processors and computer machines, character patterns of different key arrangement modes are stored in different memories for selective read-out so that any key arrangement mode chosen by an operator should be visually indicated on keys, thereby enabling use of a keyboard in various modes.

3 Claims, 2 Drawing Sheets

2 1 K 2 1 K 2 1 K
4 3 4 3 4 3
8 7 Sk 9a 9b 5
MULTIPLEXER
16 MEMORY
CONTROL UNIT 15
READOUT CONTROL 17
LUMINANT ARRAY 11
LUMINESCENCE DRIVE CIRCUIT 12
20-1 DISPLAY ROM
20-2 DISPLAY ROM
20-3 DISPLAY ROM
20-n DISPLAY ROM

K
SK

KEYBOARD

BACKGROUND OF THE INVENTION

The present invention relates to an keyboard, and more particularly relates to a keyboard well adapted for use in data input on a word processor and a computer machines.

Conventional keyboards for such applications are roughly classified into three types, i.e. a Kana exclusive type, an Alphabet exclusive type and a combination type. In the case of the Kana exclusive type keyboard, keys are arranged according to JIS regulation and Kana (the Japanese syllabary) characters are marked on the keys. Whereas, in the case of the Alphabet exclusive type keyboard, keys are arranged according to ASC11 regulation and Alphabetic characters are marked on the keys. Due to no interchangeability between the types, a keyboard of one type is not usable for the other type.

Interchangeability is more or less improved by use of a combination type keyboard in which Kana and Alphabetic characters are marked together on same keys. Despite this advantage, the combination type keyboard has a great disadvantage that there is no visual indication of the mode (Kana or Alphabet) currently in operation.

There is one more disadvantage common to conventional keyboards. A keyboard is generally provided with character input keys and function keys. Because the positions of the function keys are fixed on the board, it is infeasible to freely change the positions of the function keys depending on operation demands.

SUMMARY OF THE INVENTION

It is the object of the present invention to provide a keyboard suited for use in different modes with possibility of free change in function key positions depending on operation demands.

In accordance with the basic aspect of the present invention, character patterns of different key arrangement modes are stored in different memories and those of a selected key arrangement mode are read out sequentially for visual indication on keys of a keyboard.

DESCRIPTION OF THE PREFERRED EMBODIMENTS

Figure 1:
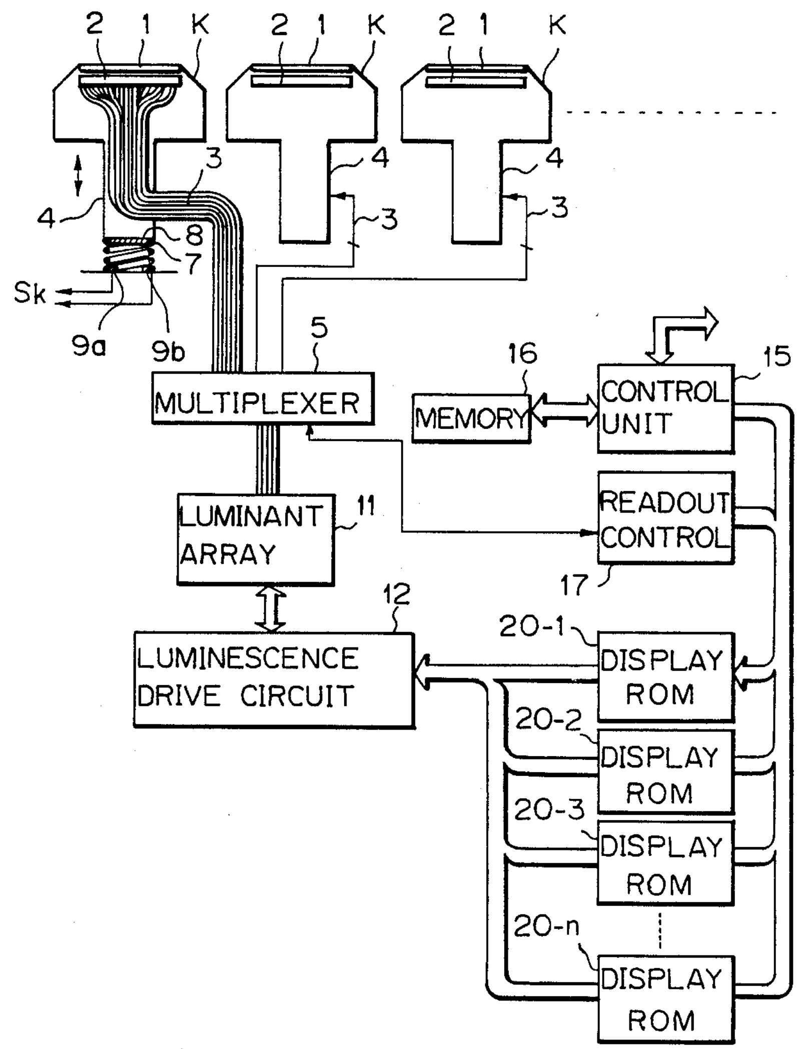
FIG. 1 is a block diagram of one embodiment of the keyboard in accordance with the present invention and FIG. 2 is a top plan view of the keyboard.
Figure 2:
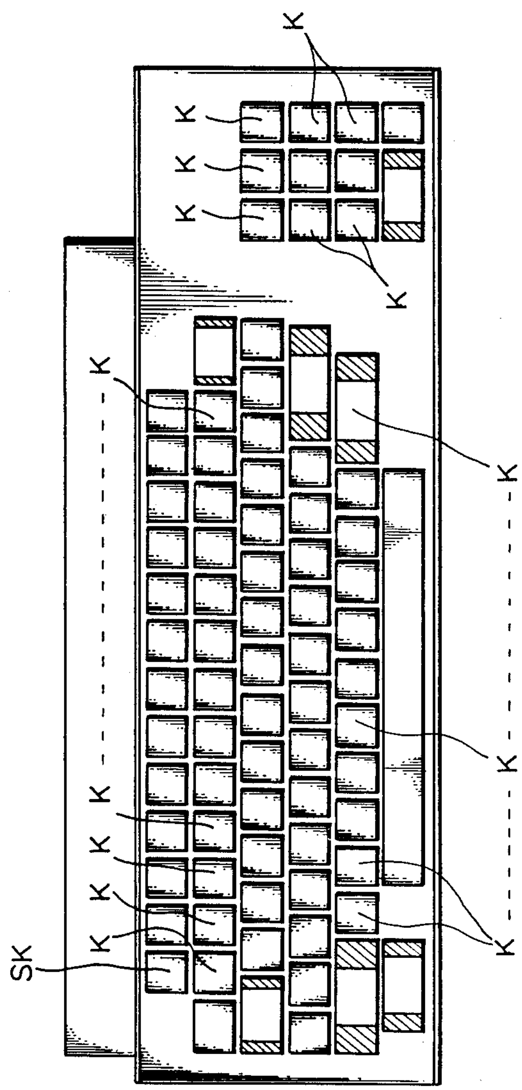

One embodiment of the keyboard in accordance with the present invention is shown in FIG. 1, in which a plurality of keys K are arranged in a matrix array as shown in FIG. 2. Each key K is provided with a top window closed by a transparent plate 1 and a dot indicator 2 of a 24×24 matrix array arranged beneath the transparent plate 1. One end of an optical fiber bundle 3 is fixed to the dot indicator 2 in a 24×24 matrix array. The optical fiber bundle 3 extends through a lower extension 4 of the key K and the other end thereof is connected to one output terminal of a multiplexer 5.

A compression spring 7 is interposed between the bottom of the lower extension 4 and a board base to constantly urge the key K to move upwards. An electrically conductive contact 8 is mounted to the bottom of the lower extension 4 and a pair of electrically conductive contacts 9*a* and 9*b* are arranged on the board base just below the contact 8. When the key K is depressed, the contact 8 bridges the two contacts 9*a* and 9*b* for generation of a switch signal Sk. Other keys are provided with same constructions.

One input terminal of the multiplexer 5 is connected to a luminant array 11. The output light from the luminant array 11 is transmitted to the dot indicator 2 of a key K selected by the multiplexer 5. This light is transmitted to all keys K at a prescribed as the output terminals of the multiplexer 5 are scanned sequentially. The luminant array 11 includes light emitting elements such as LEDs arranged in a 24×24 matrix array. The positions of the light emitting elements in the array corresponds to the positions of the optical fiber bundles 3 connected to the dot indicators 2 of different keys K. As a consequence, a character indicated by the luminant array 11 is indicated in its original pattern on the dot indicator 2 of a corresponding key K selected by the multiplexer 5.

The keyboard is further provided with a control unit 15 in the form of, for example, a CPU of 8 bits. This control unit 15 is connected to a memory 16. This memory 16 includes a ROM storing programs for the control unit 15 and a RAM made up of various work areas. The output terminal of the control unit 15 is connected to display ROMs 20-1 to 20-n. Each display ROM stores a character pattern to be transmitted to the dot indicator 2 of a corresponding key K. For example, the display ROM 20-1 stores a character pattern corresponding to key display in JIS mode, the display ROM 20-2 stores a character pattern corresponding to key display in ASC11 mode, and the display ROM 20-3 stores a character pattern corresponding to key display in Kana mode. Output terminals of the display ROMs 20-1 to 20-n are connected to a luminescence drive circuit 12 which controls operation of the luminant array 11 depending on character pattern data supplied thereto.

The control unit 15 operates to select one of the display ROMs 20-1 to 20-n one time and, after each selection, the readout control 17 reads out the selected character pattern for transmission to a corresponding key K via the multiplexer 5. That is, the higher bit addresses of each display ROM are selected by the control unit 15 whereas the lower bit addresses are selected by the readout control 17. Reading-out by the readout control 17 is synchronized with scanning by the multiplexer 5. Thus, the read-out timing of a character pattern coincides with the selection timing of a key K on which the character pattern is to be indicated.

Every time one of the select keys SK shown in FIG. 2 is depressed, the control unit 15 cyclically and sequentially selects the display ROMs 20-1 to 20-n. The control unit 15 further sequentially scans the keys K to check the state (ON/OFF) of the switch signal Sk and the results are transmitted to a proper external devices.

The above-described keyboard operates as follows.

First one of the select keys SK is depressed in order to select a display ROM corresponding to a key arrangement to be employed. It is now assumed that the display ROM 20-1 was selected. Then, the readout control 17 sequentially reads out character patterns in accordance with the JIS regulation for transmission to the luminescence drive circuit 12. On receipt of each character pattern, the luminescence drive circuit 12 forces the luminant array 11 to indicate the character pattern. In synchronism with this process, the multiplexer 5 scans the keys K sequentially. Thus, each character pattern from the luminant array 11 is indicated at the dot indicator 2 of a corresponding key K. This scanning by the multiplexer can be advanced at a relatively high speed. So, although indication of the character patterns is performed in a sequential mode, a viewer has a visual impression as is the character patterns were concurrently indicated on all keys and, as a consequence, recognizes that the machine is now in the JIS mode. Similarly, selection of the display ROM 20-2 provides the ASC11 mode and selection of the display ROM 20-3 provide the Kana mode. When another display ROM is selected, the machine is set to a corresponding mode.

In the case of the above-described embodiment, transmission of the output light from the luminant array 11 is shifted by the multiplexer 5. As a substitute, however, the number of the luminant array may be chosen equal to that of the keys so that transmission of the output electric signal from the luminescence drive circuit 12 should be shifted by the multiplexer 5.

As a substitute for the direct transmission of the light to the keys, a chip type indicator such as a liquid crystal indicator may be arranged on each key so that a drive electric signal should be passed to the key. Instead of the above-described dynamic indication, static indication may be employed too.

In accordance with the present invention, a keyboard can be used in various modes and the number of practiciable modes can be freely chosen depending on operation demands by incorporating proper number of display ROMs.

We claim:

1. An improved keyboard comprising a plurality of keys arranged in a matrix array for displaying selected character patterns, a character pattern indicator mounted atop each of said keys, each of said character pattern indicators including a plurality of dot indicators arranged in a matrix array for forming an image of a selected character pattern, a plurality of memories each storing a series of character patterns of a key arrangement mode, selecting means for selecting one of said memories in accordance with operator's instruction, and transmitting means for transmitting a series of character patterns from one of said memories to corresponding ones of said character pattern indicators for visual indication of said character patterns by selected ones of said dot indicators, said transmitting means including a single multiplexer for sequentially transmitting said character patterns from one of said memories to each of said character pattern indicators of said keyboard at a sufficient rate whereby a viewer has the visual impression that said character patterns are concurrently received by said character pattern indicators.

2. An improved keyboard as claimed in claim 1 in which said transmitting means includes a luminescence drive circuit connected to said memories, a luminant array connected to said luminescence drive circuit and said single multiplexer interposed between said luminant array and said dot indicators.

3. An improved keyboard as claimed in claim 1 in which said transmitting means includes a luminescence drive circuit connected to said memories, a plurality of luminant arrays each connected to each said key and said single multiplexer interposed between said luminescence drive circuit and said luminant arrays.

* * * * *